United States Patent
Tajima

(10) Patent No.: US 8,659,794 B2
(45) Date of Patent: Feb. 25, 2014

(54) IMAGE PROCESSING APPARATUS, IMAGE PROCESSING METHOD, AND COMPUTER READABLE MEDIUM

(75) Inventor: Shingo Tajima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 106 days.

(21) Appl. No.: 13/458,584

(22) Filed: Apr. 27, 2012

(65) Prior Publication Data

US 2013/0021625 A1 Jan. 24, 2013

(30) Foreign Application Priority Data

Jul. 19, 2011 (JP) ................. 2011-158033

(51) Int. Cl.
*G03F 3/08* (2006.01)
(52) U.S. Cl.
USPC ............................ 358/1.9; 358/515; 358/518
(58) Field of Classification Search
USPC ................... 358/1.1–1.9, 1.11–1.18
See application file for complete search history.

(56) References Cited

U.S. PATENT DOCUMENTS

| 2002/0036783 A1* | 3/2002 | Yoshidome ................ 358/1.9 |
| 2004/0013958 A1* | 1/2004 | Ayaki et al. ................ 430/45 |

FOREIGN PATENT DOCUMENTS

| JP | 9-193336 A | 7/1997 |
| JP | 2004-70208 A | 3/2004 |
| JP | 2005-252323 A | 9/2005 |
| JP | 2008-28917 A | 2/2008 |

* cited by examiner

*Primary Examiner* — King Poon
*Assistant Examiner* — Ibrahim Siddo
(74) *Attorney, Agent, or Firm* — Sughrue Mion, PLLC

(57) ABSTRACT

An image processing apparatus includes a dense-light color decomposition unit that decomposes, into dense and light color components, elementary color components out of elementary color components in first print image data in a color space of a printer, in order to generate dense-light color decomposed second print image data, a converter unit that converts the color value represented by the combination of the elementary color components in the color space of the printer into a color value represented by a combination of elementary color components in a color space of a display, and supplies the color value as a conversion result to the display, and a supplying unit that extracts, from the print image data, a color component selected as a target of composite display from among the color components and supplies the extracted color component to the converter unit.

4 Claims, 7 Drawing Sheets

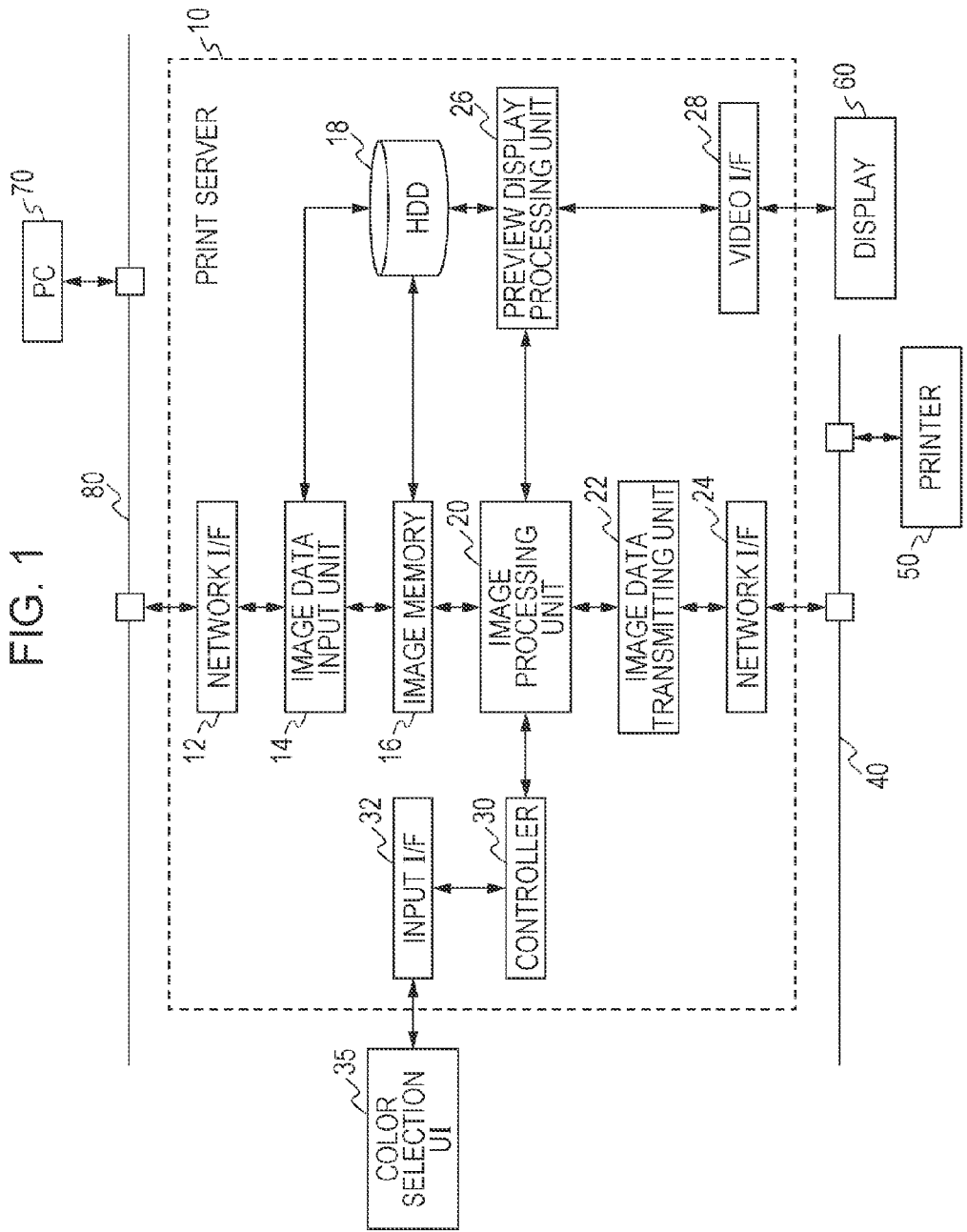

FIG. 5A

| C'(DENSE C) / Lc (LIGHT C) | DISPLAYED | HIDDEN |
|---|---|---|
| DISPLAYED | C | C" ( = C − C') |
| HIDDEN | C' | 0 |

FIG. 5B

| M'(DENSE M) / Lm (LIGHT M) | DISPLAYED | HIDDEN |
|---|---|---|
| DISPLAYED | M | M" ( = M − M') |
| HIDDEN | M' | 0 |

IMAGE PROCESSING APPARATUS, IMAGE PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-158033 filed Jul. 19, 2011.

BACKGROUND (i) Technical Field

The present invention relates to an image processing apparatus, an image processing method and a computer readable medium.

Drawing attention today is one type of printer that uses, as color materials for ink or toner, light color materials, such as light cyan material or light magenta material, in addition to materials of four elementary colors of cyan (C), magenta (M), yellow (Y), and black (K).

SUMMARY

According to an aspect of the invention, an image processing apparatus is provided. The image processing apparatus includes a dense-light color decomposition unit that decomposes n colors out of elementary color components of m colors, which is in first print image data where a color value is represented by a combination of the elementary color components of m colors in a color space of a printer, into a dense color component and a light color component respectively, so as to generate second print image data represented by color values of (m+n) color components, a converter unit that converts the color value represented by the combination of the elementary color components of m colors in the color space of the printer into a color value represented by a combination of elementary color components of p colors in a color space of a display, and supplies the color value as a conversion result to the display, and a supplying unit that extracts, from the first and/or the second print image data, a color component selected as a target of composite display from among the color components of (m+n) colors and supplies the extracted color component to the converter unit, wherein if only the light color component corresponding to the elementary color component decomposed is selected as the target of the composite display, the supplying unit, in accordance with at least one of the elementary color component of the first print image data, the dense color component and the light color component corresponding to the elementary color component of the second print image data, determines a value of the elementary color component that, with the elementary color component printed on the printer, comes to be equal in density to the value of the light color component, and supplies the determined value to the converter unit, wherein m is an integer equal to or larger than 1, and n is an integer equal to or larger than 1 and equal to or smaller than m, and p is an integer equal to or larger than 1.

BRIEF DESCRIPTION OF THE DRAWINGS

Exemplary embodiments of the present invention will be described in detail based on the following figures, wherein:

FIG. 1 illustrates an example of a print system of an exemplary embodiment of the present invention;

FIG. 5A illustrates an example of a selection rule of a color component selector;

FIG. 5B illustrates an example of the selection rule of the color component selector;

DETAILED DESCRIPTION

Figure 2A:
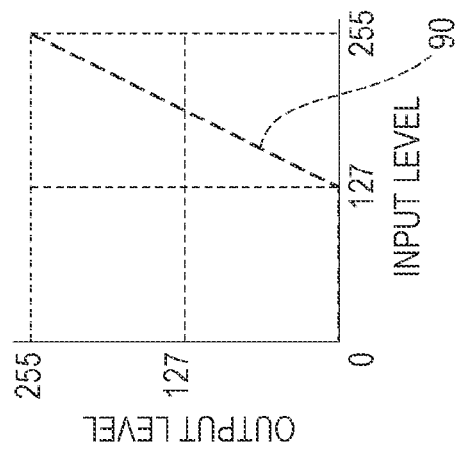
FIGS. 2A through 2C illustrate an example of a lookup table for dense-light color decomposition.

The exemplary embodiments of the present invention are described below with reference to the drawings. A print server is described as the exemplary embodiments of the present invention.

FIG. 1 illustrates an example of a print system of the exemplary embodiment of the present invention. The print system includes print server 10, printer 50, and display 60.

The printer 50 represents some of cyan (C), magenta (M), yellow (Y), and black (K) as elementary colors of standard printing using a combination of color materials of dense color (color materials such as toner or ink used to represent a color on a medium) and color materials of light color. More specifically, the printer 50 combines no or more color materials selected from a group of dense color materials and no or more color materials selected from a group of light color materials to represent the same density as a density represented by a single color material in related art. As one example, a related art color material may be used for a dense color material, and a color material of the same color type but lighter than the dense color material may be used as a light color material. But the exemplary embodiment is not limited to this example. In a representative example described below, the elementary colors M and C are respectively represented by a combination of a dense color material C and a light color material Lc and a combination of a dense color material M and a light color material Lm. Also, a related-art material is used for a dense color material, and a color material lighter than the related-art material is used for a light color material.

The print server 10 performs a control process to receive print data from a client apparatus such as a personal computer (PC) 70 via a network 80 such as a local area network (LAN), and to cause the printer 50 to do a print job in accordance with the print data received via a network 40 such as a LAN. In the control process, the print server 10 manages a print order of the print data coming from the PC 70, and converts the print data into print image data that the printer 50 can print. The print image data include, raster data, for example.

A network interface (I/F) 12 in the print server 10 controls communications performed over the network 80 between apparatuses including the PC 70. An image data input unit 14 stores print data received from the PC 70 via the network 80, or image data in the print data onto an image memory 16 or a hard disk drive (HDD) 18. The print data includes image data representing an image as a print target, and print instruction data specifying print attributes (such as the number of copies, both side printing or one side printing, and the like). The image data in the print data may be described using page description language (PDL) or bitmap (raster).

An image memory 16 serves as a work area storing the image data and the print data as a process target. The image memory 16 may be a random-access memory (RAM) having a high-speed read and write capability. The HDD 18 stores the print data itself and a variety of data generated from the print data (such as the print attribute, and the print image data generated to be supplied to the printer 50). The HDD 18 may not necessarily be an HDD. The HDD 18 may be another large-capacity storage such as a solid-state drive (SSD).

The image processing unit 20 performs an image process on the image data in the print data for the printer 50 to print the image data. The image processes include PDL interpretation process, half-tone process, resolution conversion process, data compression and decompression process, color correction (gamma correction) process, and color space conversion process. The color space conversion process includes converting RGB color space or CIEL*a*b* color space into CMYK color space, converting CMYK color space into CMYKLcLm including light colors Lc and Lm.

Figure 2B:
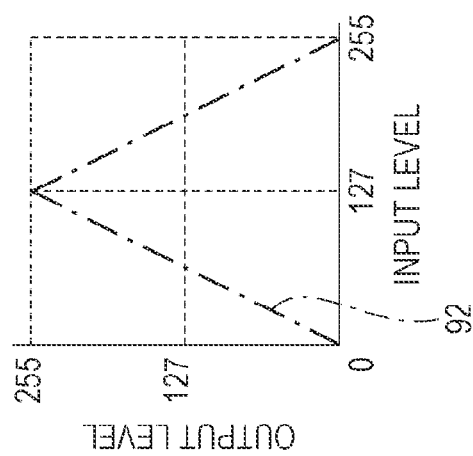
Figure 2C:
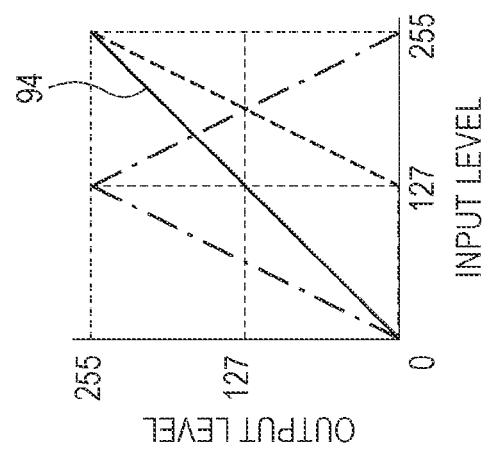

The color space conversion from the CMYK color space into the CMYKLcLm color space may be performed by decomposing each of C component and M component into a dense color component and a light color component in accordance with a lookup table (LUT). FIGS. 2A through 2C illustrate an example of the LUT used in the dense-light color decomposition. In this example, a dense color data decomposition LUT 90 and a light color data decomposition LUT 92 are used for dense-light color decomposition. More specifically, a signal (hereinafter referred to as an "elementary signal") of a particular elementary color (C for example) out of original CMYK data is input to each of the dense color data decomposition LUT 90 and the light color data decomposition LUT 92. Dense color data (C for example) are thus obtained from data of the dense color data decomposition LUT 90 and light color data (Lc for example) are obtained from data of the light color data decomposition LUT 92. As illustrated in FIGS. 2A through 2C, the value of each of an input level and an output level (density) is represented by 8 bits (i.e., 256 gradations of level values of 0 through 255).

FIGS. 2A through 2C illustrate a case in which a light color material having a density half as high as the density of the dense color material is used. More specifically, if levels of signals input to the printer 50 (i.e., an output level of each of the dense color data decomposition LUT 90 and the light color data decomposition LUT 92) are the same, the density of print results of the light color material is half as high as the density of print results of the dense color material. In this example, the dense color data decomposition LUT 90 provides an output level of 0 in response to a low density range of input level 0 through input level of 127. In a high density range of input level 128 through input level of 255, the dense color data decomposition LUT 90 provides an output level that is governed by equation of output level=2×input level−255. The light color data decomposition LUT 92 provides in the low density range an output level that is governed by equation of output level=2×input level and in the high density range an output level that is governed by equation of output level=2×(255−input level).

A composite LUT 94 of FIG. 2C illustrates input and output characteristics arising from combining the light and dense color data. The input level represents the level of the elementary signal input, and the output level represents the density of print results with dense color and light color composed (in other words, the output level represents the signal level of the dense color data corresponding to a print density as the composition results). In the example here, the composite LUT 94 is represented by a straight line along which the relationship of the output level=the input level holds.

As illustrated in FIGS. 2A through 2C, the output level of the dense color data is 0 in a low density range of from input level 0 through input level 127, and printing is performed using only a light color material. In a high density range of from input level 128 through input level 255, printing is performed using a light color material and a dense color material in combination. For example, when the level of an elementary signal (input level) is 127, the signal level of the dense color data output from the dense color data decomposition LUT 90 of FIG. 2A is 0 and the signal level of the light color data output from the light color data decomposition LUT 92 of FIG. 2B is 255. Since the light color material is half as dense as the dense color material, a density of a printing result corresponding to a signal level 255 of the light color data, if converted into the dense color data, is 127 (half as high as 255). When the input level is 255, the output level of the dense color data is 255, and the output level of the light color data is 0. The composition result of the two units of data is a density corresponding to the dense color data level 255.

The input and output relationship of the dense color data decomposition LUT 90 and the light color data decomposition LUT 92 illustrated in FIGS. 2A through 2C is only one example. Any dense color data decomposition LUT 90 and any light color data decomposition LUT 92 may be used as long as the LUTs satisfy a relationship that the composite print density of the dense color data and the light color data, resulting from decomposing the elementary signal, equals the print density of the original elementary signal. For example, the input and output relationships of the dense color data decomposition LUT 90 and the light color data decomposition LUT 92 are linear in FIGS. 2A through 2C. Alternatively, the input and output relationship may be curved. The use of the light color material half as dense as the dense color material is an example only. The same dense color data decomposition LUT 90 and the same light color data decomposition LUT 92 may be commonly applied to all the colors as application targets. Alternatively, the dense color data decomposition LUT 90 and the light color data decomposition LUT 92 used for the application target colors may be set to be different from color to color.

Figure 3:
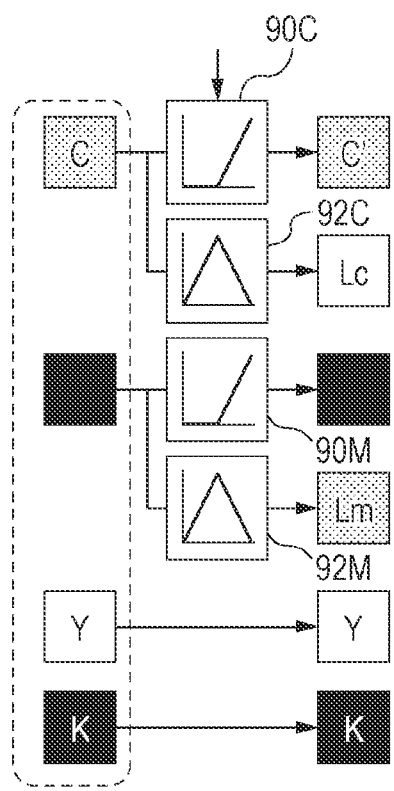
FIG. 3 illustrates an example of the dense-light color decomposition.

According the exemplary embodiment, C and M of the CMYK elementary colors are decomposed into dense color data C' and light color data Lc and dense color data M', light color data Lm using a dense color data decomposition LUT 90C and a light color data decomposition LUT 92C, and a dense color data decomposition LUT 90M and a light color data decomposition LUT 92M as illustrated in FIG. 3. Y and M elementary signals are not decomposed into light and dense colors.

Returning back to the discussion of FIG. 1, the image processing unit 20 performs an image process, thereby generating on an image memory 16 print image data of CMYK or C'M'YKLcLm with which the printer 50 is compatible. The print image data is composed of image data of four color components of elementary colors of C, M, Y, and K, or image data of six color components of colors of Lc and Lm in addition to C, M, Y, and K. The image data transmitting unit 22 transmits the generated print image data to the printer 50 via a network interface 24 and the network 40. The print server 10 may have a function to store the generated print image data on the HDD 18 first, and then to transmit the stored print image data to the printer 50 when it is time to print according to a printing order. Also, the print server 10 may have a function to perform a process, such as a color correction, on the print image data stored on the HDD 18, and then to transmit the processed print image data to the printer 50.

The preview display processing unit 26 generates a preview image to verify, in accordance with an image displayed on the display 60, the print image data of the color components of CMYK or C'M'YKLcLm generated by the image processing unit 20. The preview display processing unit 26 may also have a function to convert the print image data represented by CMYK or C'M'YKLcLm into image data in a color space compatible with the display 60, such as RGB data.

Alternatively, this function may be implemented by partly using a color space conversion function of the image processing unit 20. According to the exemplary embodiment, the preview display processing unit 26 has a function to generate a preview image by composing data of all the color components of C', M', Y, K, Lc, and Lm forming the print image data, but also has a function to generate a preview image by composing data of at least one color component of C', M', Y, K, Lc, and Lm selected from the color component data by a user. The preview display processing unit 26 related to these functions is described in detail below.

The color detection user interface (UI) 35 specifies a color component to compose a preview display. The color detection UI 35 may be implemented as a combination of a graphic user interface (GUI) displayed on the display 60 and an input device, such as a pointing device, connected to the print server 10. The GUI of the color detection UI 35 may include a check box or a button, which receives a destination as to which of the color components C', M', Y, K, Lc, or Lm is to select as a target of a composite display. Such an arrangement is an example only. This arrangement allows four options for selection of elementary color components dense-light decomposed. The four options include selecting a dense color only, selecting a light color only, selecting both a dense color and a light color (i.e., selecting the original elementary color components themselves), and selecting neither dense color nor light color (i.e., selecting none of the original elementary color components at all). As for the elementary color C, the four options include selecting C' only, selecting Lc only, selecting both C' and Lc, and selecting neither C' nor Lc. The options are indicated by a combination of the presence or absence of the selections determined by the check boxes of C' and Lc. The exemplary embodiment is not limited to specifying one of the four options by the combination of the presence or absence of the selections of C' and Lc. Another UI method may also be acceptable. For example, four check boxes or four buttons respectively corresponding to the four options may be arranged. The selection results input on the color detection UI 35 by the user are retrieved into the print server 10 by an input interface 32, and then transferred to a controller 30. The controller 30 is a module that generally controls the print server 10, and transfers the selection results received from the color detection UI 35 via the input interface 32 to the preview display processing unit 26. The preview display processing unit 26 composes color components in accordance with the received selection results, thereby generating a preview image. The generated preview image is transferred to the display 60 via a video interface 28 to be displayed on the display 60. The display 60 is not limited to any particular type. The display 60 may be one of a liquid-crystal display, an organic electroluminescence (EL) display, and a cathode-ray tube (CRT), for example.

Figure 4:
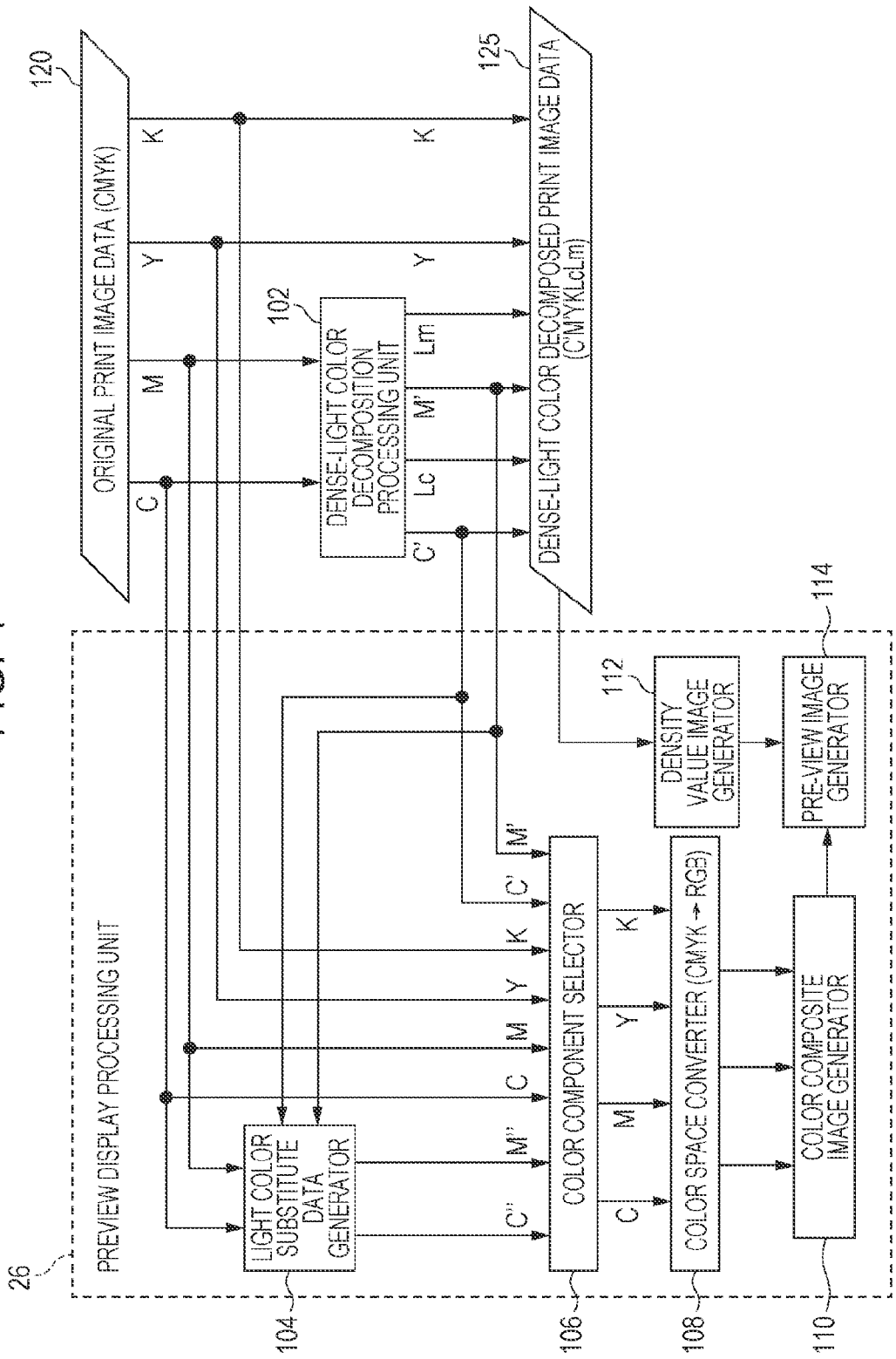
FIG. 4 is a block diagram of a preview display processing unit.

FIG. 4 illustrates an example of the preview display processing unit 26 in detail. In this example, a dense-light color decomposition processing unit 102 in the image processing unit 20 dense-light decomposes color components C and M out of original print image data 120 represented by four elementary colors of CMYK before dense-light decomposition. The dense-light color decomposition processing unit 102 thus generates dense-light color decomposed print image data 125 represented by six colors of C'M'YKLcLm. The dense-light color decomposition processing unit 102 may dense-light color decompose C and M color components in accordance with the method described with reference to FIGS. 2A-2C and 3.

The preview display processing unit 26 generates a color composite preview image by composing a color component image, selected on the color detection UI 35 by the user, out of the color components C'M'YKLcLm of the dense-light color decomposed print image data 125. Since the color composite preview image is intended to be displayed on the display 60, the color composite preview image is to be represented in the color space of the display 60. In the example here, the color space of the display 60 is the widely used RGB color space. In a standard method, the preview display processing unit 26 converts the color space of the six color components of C'M'YKLcLm into the RGB color space. In the exemplary embodiment, however, within the preview display processing unit 26, a color space converter 108 is responsible for color space conversion, and thus converts a color space from four elementary colors of CMYK into the RGB color space. The color space converter 108 that converts the color space from the CMYK to RGB may be any of converters in widespread use in related art. The color space converter 108 features a small size LUT and a low workload of an arithmetic process in comparison with a module that converts the color space from the six color components of C'M'YKLcLm to RGB. Regardless of whether the color space converter 108 is implemented in software or hardware, the color space converter 108 smaller in size than a converter that converts C'M'YKLcLm into RGB satisfactorily works.

According to the exemplary embodiment, a color component selector 106 and a light color substitute data generator 104 are arranged to use the color space converter 108 that converts the color space from CMYK to RGB.

The color component selector 106 receives information of the selection result of a color component as a composition target selected on the color detection UI 35 by the user, via the input interface 32 and the controller 30, selects the color component as the composition target from the print image data, and outputs the selected color component to the color space converter 108. Care is to be exercised when the light color data are handled in the process of the color component selector 106. Since the light color data are printed using a light color material lower in print density, a data value of the light color data is substantially higher than a density of print results. The light color data, if directly supplied to the color space converter 108, are handled as having an erroneous density far higher than a practical print density. As illustrated in FIGS. 2A through 2C, a light color material having a density half as low as a standard color value is used. For example, if a light color data value 255 is printed, a density of a print result is half the data value, i.e., 127. The light color data value 255, if directly input to the color space converter 108, is handled as an elementary color having a density of 255 twice as high as the actual print density 127. In contrast, the dense color data are printed using a standard dense color material. If the dense color data are directly supplied, the color space converter 108 converts the supplied data correctly.

A color substitute data generator 104 is arranged to handle such light color data as illustrated in FIG. 4. Using the relationship that the original elementary color components are decomposed into the dens color component and the light color component, the light color substitute data generator 104 generates a light color substitute data value representing a print density of the light color component in accordance with the original elementary color component and the dense color component. In the example where the standard color material is used for the dense color material, and a color material having a density half as low as the density of a standard color material is used for the light color material, the following relationship holds as densities of print results among the original elementary color components C and M, and the dense color data C' and M' and the light color data Lc and Lm after color decomposition:

$$C = C' + (½)Lc$$

$$M = M' + (½)Lm$$

where (½)Lc and (½)Lm respectively represent densities of print results of the light color data C and M. From the above relationship, the following relationship is derived:

(Print density of light color data $C$)=$C''$=(½)$Lc$=$C$−$C'$ (Print density of light color data $M$)=$M''$=(½)$Lm$=$M$−$M'$ Substitute data C"=C−C' and M"=M−M' result if print densities of the light color data Lc and Lm are represented by density values of standard color values (equal to the value of the dense color material here). Although the density of the light color material is half as high as the density of the standard color material in the above discussion, the relationship C"=C−C' and M"=M'M' normally holds as long as the standard color material is used for the dense color material (i.e., the standard material is the color material corresponding to the C and M components of the original CMYK). More specifically, in the principle of the color decomposition, the print density of the original elementary color component is equal to the sum of the print density of the dense color component and the print density of the light color component after the color decomposition. Since the original elementary color component and the dense color component are based on the same standard color components, and are measured on the same scale of density data. If the dense color component is simply subtracted from the original elementary color component, the resulting difference is the print density of the light color component that is expressed on the scale of the standard color material. This relationship normally holds regardless of whatever relationship the density of the light color material has with the density of the standard color material.

Using these relationships, the light color substitute data generator 104 calculates C−C' as the substitute data C" of the light color data Lc and M−M' as the substitute data M" of the light color data Lm, and then supplies the resulting substitute data C" and M" to the color component selector 106. To this end, the light color substitute data generator 104 receives the components C and M of the original print image data 120 of CMYK and the dense color components C' and M' of the dense-light color decomposed print image data 125.

The color component selector 106 receives the color component data of the color components C, M, Y, and K of the original print image data 120, the color component data of the dense color components C' and M' of the dense-light color decomposed print image data 125, and the color component data of the substitute data C" and M" generated by the light color substitute data generator 104. The color component selector 106 selects from the input color component data group the color component data meeting the selection result of the color detection UI 35, and then supplies the selected color component data to the color space converter 108.

The color component selector 106 handles the color component not dense-light color decomposed (here Y and K) as below. If the color component is simply selected as the composition target, the color component selector 106 supplies to the color space converter 108 the color component data of that color component as input data. If the color component is not selected, the color component selector 106 supplies to the color space converter 108 zero as the input data of that color component.

As for the color component to be color decomposed (here C and M), the color component selector 106 switches the color component data as an input of that color component to the color space converter 108 in accordance with the selection rule of FIGS. 5A and 5B. As for the elementary color C, for example, the color component selector 106 supplies to a C input of the color space converter 108 the color component data of the elementary component C of the original print image data 120 as illustrated in FIG. 5A if both the dense color component C' and the light color component Lc are selected as the composite display target. The color component selector 106 supplies to the C input of the color space converter 108 the color component data of the dense color component C' of the dense-light color decomposed print image data if the dense color component C' only is selected. The color component selector 106 supplies to the C input of the color space converter 108 the color component data of the light color substitute data C" if the light color component Lc only is selected. If none of the dense color component C' and the light color component Lc are selected, the color component selector 106 supplies zero to the C input of the color space converter 108 (data value indicating no color component). As for the elementary color M, the color component selector 106 selects the color component data to be supplied to the color space converter 108 as illustrated in FIG. 5B in accordance with the selection rule similar to the case of the elementary color C.

The light color component only may be selected for the elementary color C, both the dense color component and the light color component may be selected for the elementary color M, and the Y and K components may be selected for the composite display targets. In such a case, the color component selector 106 supplies the color component data of each of C", M, Y, and K to the color space converter 108. For example, both the dense and light components of C may be selected to be hidden, the dense color component only of M may be selected to be displayed, the color component of Y may be selected to be hidden, and the color component K may be selected to be displayed. In such a case, the color component selector 106 supplies the color component data of M' and K to the color space converter 108.

The color space converter 108 receives the color component data of each of the components C, M, Y, and K supplied from the color component selector 106, and performs a color space conversion process on the combination of the color component data from CMYK to RGB. The conversion process is performed on a per pixel basis of the print image data. Data of each of the components RGB as the conversion results are input to a color composite image generator 110.

The color composite image generator 110 generates color composite image data to be displayed, by converting the input data of each of the R, G, and B components into a single file of an image file format (such as bitmap (BMP)) appropriate to be displayed on the display 60. The generated color composite image data (RGB) are input to a preview image generator 114.

A density value image generator 112 generates a density value image as one of the display elements on a preview screen. The density value image indicates a value of a density of each component in the dense-light color decomposed print image data 125. If the user points to a pixel of interest using a pointing device on a preview screen displayed on the display 60, the density value image generator 112 retrieves a value of each of the components C', M', Y, K, Lc, and Lm of that pixel in the dense-light color decomposed print image data 125, and then generates the density value image that lists those values. The density value image thus generated is input to the preview image generator 114.

The preview image generator 114 generates the preview image. The preview image includes the color composite image supplied from the color composite image generator 110 and the density value image supplied from the density value image generator 112, displayed side by side within one screen window. The generated preview image is displayed on the display 60 via the video interface 28.

As described above, the preview display processing unit 26 of FIG. 4 performs the color space conversion process on a composite image of a combination of any color components of C', M', Y, K, Lc, and Lm using the color space converter 108. The color space converter 108 converts the color space from the CMYK color space in widespread use in related art to the RGB color space.

The exemplary embodiment has been described for exemplary purposes only, and a variety of modifications thereof are possible within the scope of the invention.

Figure 6:
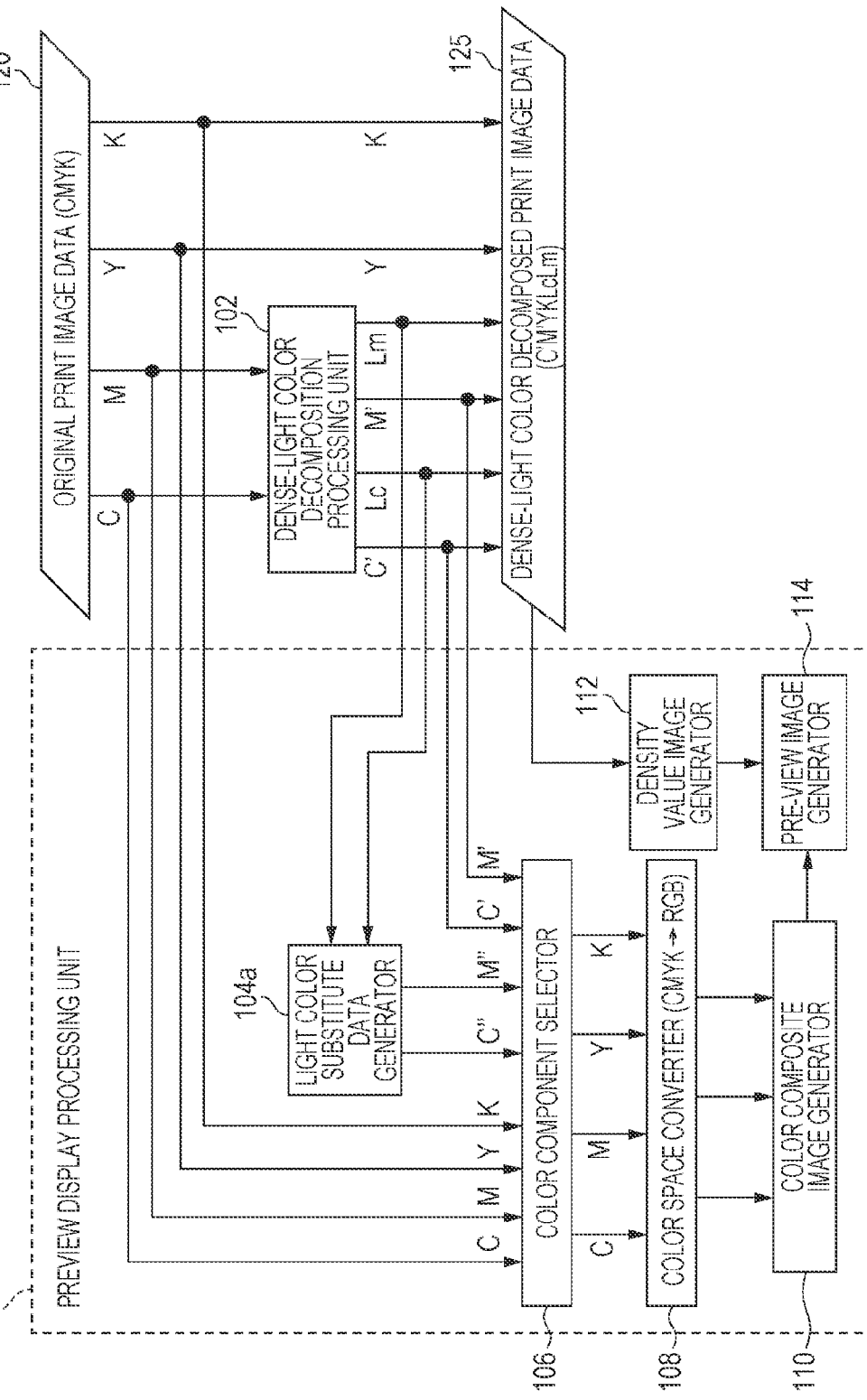
FIG. 6 is a block diagram of a modification of the preview display processing unit.
Figure 7:
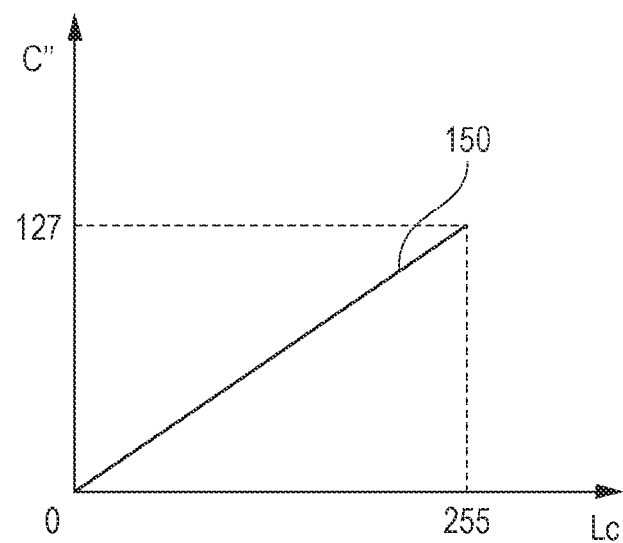
FIG. 7 illustrates a relationship used by a light color substitute data generator.

A modification of the exemplary embodiment illustrated in FIG. 6 includes a light color substitute data generator 104a in place of the light color substitute data generator 104 of FIG. 4. The light color substitute data generator 104a generates light color substitute data C" and M" from the light color data Lc and Lm of the dense-light color decomposed print image data 125. The light color substitute data generator 104a uses the relationship of Lc and Lm to C" and M" to determine the light color substitute data C" and M" from the light color data Lc and Lm. FIG. 7 illustrates an example of the relationship. More specifically, FIG. 7 illustrates a relationship 150 between the light color data Lc of the elementary color C and the substitute color data C". In the relationship 150, the light color material of Lc has a density half as high as the density of the color material of the elementary color C in the entire defined range of Lc. The substitute color data C" responsive to the input light color data Lc is determined from the relationship 150, and then supplied to the color component selector 106. The relationship 150 may be determined empirically, for example, by measuring a density of an actual print result responsive to a variety of values of the light color data Lc. Lc has been discussed. The same is true of Lm. The relationship 150 is not particularly limited to any implementation method. The relationship 150 may be implemented using LUT, or function, or may be implemented in software or hardware.

The light color substitute data generator 104 of FIG. 4 is simpler in system structure than the light color substitute data generator 104a of FIG. 6. This is because the light color substitute data generator 104 of FIG. 4 calculates the light color substitute data through a subtraction operation of existing color components (C"=C−C', for example) while the light color substitute data generator 104a of FIG. 6 employs LUT or function.

In the examples of FIGS. 2A-2C and FIG. 3, the color decomposition is performed on each elementary color using the LUT for the color decomposition. The present invention is not limited to this method. The present invention is not dependent on how color is decomposed. For example, the present invention is applicable to a method of obtaining a combination of dense-light color decomposition results C', M', Lc and Lm through a two-dimensional LUT. The two-dimensional LUT receives as an input a set of elementary signals C and M.

In the exemplary embodiment discussed heretofore, the elementary colors C and M are decomposed. This method has been discussed for exemplary purposes only. The present invention is generally applicable to the case in which at least one color is selected from the elementary colors C, M, Y, and K for the color decomposition.

In the above discussion, the color space of the printer 50 is CMYK, and the color space of the display 60 is RGB. The present invention is also applicable to the case in which the printer 50 and the display 60 respectively have color spaces different from those described above. The present invention, if described more generally, is applicable to a system that decomposes, into a dense color component and a light color component, elementary color components of n colors as decomposition targets (n being an integer equal to or larger than 1 and equal to or smaller than m), out of elementary color components of m colors (m being an integer equal to or larger than 1) in first print image data where a color value is represented by a combination of elementary color components of m colors in a color space of a printer, generates second print image data dense-light color decomposed and represented by color values of (m+n) color components, supplies the second print image data to the printer for printing, and uses a display having a color space represented by a combination of elementary color components of p colors (p being an integer equal to or larger than 1).

The present invention is applicable to not only the print server 10 of FIG. 1 but also to other apparatuses include a printer, a complex machine, and client computers (including PC and workstations).

The color component composition function for the preview display described above is implemented when a general-purpose computer executes a program describing the above process. The computer as a hardware structure is a circuit structure including a microprocessor such as a central processing unit (CPU), a random-access memory (RAM), a read-only memory (ROM), a hard-disk drive (HDD) connected via a HDD controller, a variety of input-output interfaces (I/Fs), and a bus interconnecting these elements. The bus may connect to a network interface for connection with a network, such as a local area network. Also connected to the bus via an input-output interface are a disk drive and a memory reader-writer. The disk drive reads data from and/or writes data to portable type disk recording media including compact disk (CD) and digital versatile disk (DVD). The memory reader-writer reads data from and/or writes data to portable nonvolatile recording media complying with a variety of specifications and including a flash memory. The program describing the process content of each functional module is stored on a fixed storage device such as the HDD in the computer, via the recording medium such as CD or DVD, or via a communication medium such as a network, and is thus installed on the computer. The installed program is read onto the RAM, and then executed by the microprocessor such as the CPU. The color component composition and display function described above is implemented. Part or whole of a functional module group may be implemented using hardware circuits. The hardware circuits include an exclusive large scale integration (LSI), an application specific integrated circuit (ASIC), a field programmable gate array (FPGA), and a discrete circuit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
a dense-light color decomposition unit that decomposes n colors out of elementary color components of m colors, which is in first print image data where a color value is represented by a combination of the elementary color components of m colors in a color space of a printer, into a dense color component and a light color component respectively, so as to generate second print image data represented by color values of (m+n) color components;
a converter unit that converts the color value represented by the combination of the elementary color components of m colors in the color space of the printer into a color value represented by a combination of elementary color components of p colors in a color space of a display, and supplies the color value as a conversion result to the display; and
a supplying unit that extracts, from the first and/or the second print image data, a color component selected as a target of composite display from among the color components of (m+n) colors and supplies the extracted color component to the converter unit, wherein if only the light color component corresponding to the elementary color component decomposed is selected as the target of the composite display, the supplying unit, in accordance with at least one of the elementary color component of the first print image data, the dense color component and the light color component corresponding to the elementary color component of the second print image data, determines a value of the elementary color component that, with the elementary color component printed on the printer, comes to be equal in density to the value of the light color component, and supplies the determined value to the converter unit,
wherein m is an integer equal to or larger than 1, and n is an integer equal to or larger than 1 and equal to or smaller than m, and p is an integer equal to or larger than 1.

2. The image processing apparatus according to claim 1, wherein if the light color component is selected as the target of the composite display from among the elementary color components, the supplying unit supplies a subtraction result, arising from subtracting the dense color component of the elementary color component included in the second print image data from the elementary color component of the first print image data, to the converter unit as a value of the elementary color component that, with the elementary color component printed on the printer, comes to be equal in density to the value of the light color component.

3. An image processing method, comprising:
decomposing n colors out of elementary color components of m colors, which is in first print image data where a color value is represented by a combination of the elementary color components of m colors in a color space of a printer, into a dense color component and a light color component respectively, so as to generate second print image data represented by color values of (m+n) color components;
converting the color value represented by the combination of the elementary color components of m colors in the color space of the printer into a color value represented by a combination of elementary color components of p colors in a color space of a display, and supplying the color value as a conversion result to the display; and
extracting, from the first and/or the second print image data, a color component selected as a target of composite display from among the color components of (m+n) colors and supplying the extracted color component when the color value is converted, wherein if only the light color component corresponding to the elementary color component decomposed is selected as the target of the composite display, the supplying, in accordance with at least one of the elementary color component of the first print image data, and the dense color component and the light color component corresponding to the elementary color component of the second print image data, determining a value of the elementary color component that, with the elementary color component printed on the printer, comes to be equal in density to the value of the light color component, and supplying the determined value in the converting,
wherein m is an integer equal to or larger than 1, and n is an integer equal to or larger than 1 and equal to or smaller than m, and p is an integer equal to or larger than 1.

4. A Non-Transitory computer readable medium storing a program causing a computer to execute a process for processing an image, the process comprising:
decomposing n colors out of elementary color components of m colors, which is in first print image data where a color value is represented by a combination of the elementary color components of m colors in a color space of a printer, into a dense color component and a light color component respectively, so as to generate second print image data represented by color values of (m+n) color components;
converting the color value represented by the combination of the elementary color components of m colors in the color space of the printer into a color value represented by a combination of elementary color components of p colors in a color space of a display, and supplying the color value as a conversion result to the display; and
extracting, from the first and/or the second print image data, a color component selected as a target of composite display from among the color components of (m+n) colors and supplying the extracted color component when the color value is converted, wherein if only the light color component corresponding to the elementary color component decomposed is selected as the target of the composite display, the supplying, in accordance with at least one of the elementary color component of the first print image data, and the dense color component and the light color component corresponding to the elementary color component of the second print image data, determining a value of the elementary color component that, with the elementary color component printed on the printer, comes to be equal in density to the value of the light color component, and supplying the determined value in the converting,
wherein m is an integer equal to or larger than i, and n is an integer equal to or larger than 1 and equal to or smaller than m, and p is an integer equal to or larger than i.

* * * * *